(12) United States Patent
Adams et al.

(10) Patent No.: US 9,434,645 B2
(45) Date of Patent: Sep. 6, 2016

(54) SYSTEM AND METHOD FOR LASER-BASED, NON-EVAPORATIVE REPAIR OF DAMAGE SITES IN THE SURFACES OF FUSED SILICA OPTICS

(71) Applicant: Lawrence Livermore National Security, LLC, Livermore, CA (US)

(72) Inventors: John J. Adams, Livermore, CA (US); Masoud Bolourchi, Livermore, CA (US); Jeffrey D. Bude, Danville, CA (US); Gabriel M. Guss, Manteca, CA (US); Jeffery A. Jarboe, Livermore, CA (US); Manyalibo J. Matthews, Livermore, CA (US); Michael C. Nostrand, Livermore, CA (US); Paul J. Wegner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 535 days.

(21) Appl. No.: 13/707,053

(22) Filed: Dec. 6, 2012

(65) Prior Publication Data

US 2013/0139551 A1    Jun. 6, 2013

Related U.S. Application Data

(60) Provisional application No. 61/567,581, filed on Dec. 6, 2011.

(51) Int. Cl.
*C03C 23/00* (2006.01)
*B23K 26/00* (2014.01)
*B23K 26/06* (2014.01)

(52) U.S. Cl.
CPC ....... *C03C 23/0025* (2013.01); *B23K 26/0081* (2013.01); *B23K 26/0626* (2013.01)

(58) Field of Classification Search
CPC .................................................. C03C 23/0025
See application file for complete search history.

(56) References Cited

U.S. PATENT DOCUMENTS

| 4,731,254 A | * | 3/1988 | Heineken et al. | ............ | 427/554 |
| 4,731,293 A | * | 3/1988 | Ekholm et al. | ............ | 428/426 |
| 5,427,825 A | * | 6/1995 | Murnick | ........... | 427/555 |
| 6,518,539 B2 | | 2/2003 | Hackel et al. | | |

(Continued)

OTHER PUBLICATIONS

Temple, Paul A., et al. "Carbon dioxide laser polishing of fused silica surfaces for increased laser-damage resistance at 1064 nm," Applied Optics, vol. 21, Issue 18, pp. 3249-3255 (1982), http://dx.doi.org/10.1364/AO.21.003249.

(Continued)

*Primary Examiner* — Angela Ortiz
*Assistant Examiner* — Cynthia Szewczyk
(74) *Attorney, Agent, or Firm* — Harness, Dickey & Pierce PLC (57) ABSTRACT

A method for repairing a damage site on a surface of an optical material is disclosed. The method may involve focusing an Infrared (IR) laser beam having a predetermined wavelength, with a predetermined beam power, to a predetermined full width ("F/W") $1/e^2$ diameter spot on the damage site. The focused IR laser beam is maintained on the damage site for a predetermined exposure period corresponding to a predetermined acceptable level of downstream intensification. The focused IR laser beam heats the damage site to a predetermined peak temperature, which melts and reflows material at the damage site of the optical material to create a mitigated site.

17 Claims, 5 Drawing Sheets

(56) References Cited

U.S. PATENT DOCUMENTS

| | | | |
|---|---|---|---|
| 6,878,900 B2* | 4/2005 | Corkum et al. | 219/121.69 |
| 2002/0046579 A1* | 4/2002 | Peterson et al. | 65/386 |
| 2002/0070198 A1* | 6/2002 | Brusasco et al. | 216/24 |

OTHER PUBLICATIONS

Hrubesh, Lawrence W., et al. "Methods for mitigating surface damage growth in NIF final optics." Boulder Damage. International Society for Optics and Photonics, 2002.

Brusasco, R. M., et al. "Localized CO2 Laser Treatment for Mitigation of 3ω Damage Growth in Fused Silica," SPIE—Boulder Damage Symposium on Optical Material. 2001.

Mendez, E., et al. Localized CO2 laser damage repair of fused silica optics, Applied Optics, vol. 45, Issue 21, pp. 5358-5367 (2006), http://dx.doi.org/10.1364/AO.45.005358.

Bass, Isaac L., et al., "Mitigation of laser damage growth in fused silica NIF optics with a galvanometer scanned CO2 laser", Proc. SPIE 6261, High-Power Laser Ablation VI, 62612A (Jun. 7, 2006).

Guss, Gabe, et al., "Mitigation of growth of laser initiated surface damage in fused silica using a 4.6-micron wavelength laser", published: Jan. 15, 2007; 12 pages.

Matthews, M. J., et al. "Downstream Intensification Effects Associated with CO2 Laser Mitigation of Fused Silica", SPIE—Boulder Damage Symposium, 2007, 11 pages.

Palmier, S., et al. "Optimization of a laser mitigation process in damaged fused silica", Applied Surface Science, vol. 225, 2009, 9 pages.

Adams, J. J., et al. "Results of applying a non-evaporative mitigation technique to laser-initiated surface damage on fused-silica", SPIE Laser Damage Conference, 2010, 8 pages.

Bass, Isaac L., et al. Mitigation of Laser Damage Growth in Fused Silica with a Galvanometer Scanned CO2 Laser, Proc. of SPIE vol. 5991, 59910C-1 (2005), 9 pages.

* cited by examiner

| Target Test fluence (J/cm$^2$) | Actual Test Fluence (J/cm$^2$) | Contrast % ($\sigma/F_{avg}$) | Comments |
|---|---|---|---|
| 8 | 8.4 | 18 | No Damage |
| 10 | 10.0 | 18 | No Damage |
| 12 | 12.5 | 16 | No Damage |
| 13+ | 12.3 | 16 | No Damage |
| 13+ | 13.4 | 16 | No Damage |

FIGURE 6

SYSTEM AND METHOD FOR LASER-BASED, NON-EVAPORATIVE REPAIR OF DAMAGE SITES IN THE SURFACES OF FUSED SILICA OPTICS

CROSS-REFERENCE TO RELATED APPLICATIONS

This application claims the benefit of U.S. Provisional Application No. 61/567,581 filed on Dec. 6, 2011. The disclosure of the above referenced provisional application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates broadly to systems and methods for repairing damage sites in the surfaces of fused silica optics, and more particularly to a laser-based system and method which is well suited for the non-evaporative repair of small damage sites in surfaces of fused silica optics.

BACKGROUND

The statements in this section merely provide background information related to the present disclosure and may not constitute prior art.

High energy pulses of UV light can be especially problematic for creating damage in the surface of fused-silica optics. Even more concerning, once created, damage sites can increase in size (grow) upon exposure to subsequent UV pulses and render the optic useless. For high power laser applications, such as used for fusion energy research conducted in the National Ignition Facility at Lawrence Livermore National Laboratory, the fused-silica optics are expensive and therefore a long service life is very desirable. Surface damage sites in these optics will typically initiate with a diameter in the range of tens of microns and then will grow exponentially in size upon further UV exposure. The size at which a damage site will render an optic useless depends on the specific application, however, a nominal maximum size is about 1 mm. For the present disclosure, the interest is in treating surface damage sites with diameters that are typically less than about 110 um.

Because of its very strong absorption in silicate glasses, carbon dioxide ($CO_2$) lasers operating at 10.6 μm wavelength have been used successfully to improve the damage threshold or to arrest (mitigate) the growth of laser damage in the surface of fused silica optics. $CO_2$ laser-based mitigation can be very effective in repairing the defects associated with a damage site by removal of the damaged or defective material from the optic's surface through evaporation (i.e., by heating to temperatures greater than about 2500K), or by melting and re-flowing the damaged material at temperatures below the evaporation point (i.e., temperatures below about 2500K).

Over the past three decades, several $CO_2$ laser-based mitigation techniques have been successfully developed for controlling the initiation and growth of surface damage sites in fused-silica. For a mitigation technique (herein referred to as a "mitigation protocol") to be effective, it is strongly preferable that the technique satisfies three acceptability requirements: 1) prevent the re-initiation and/or growth of a damage site upon subsequent exposure to UV laser pulses; 2) leave behind a low enough level of residual stress that nearby features (i.e. flaws and/or cracks) in the surface will not subsequently induce fracture; and 3) have a final physical shape that will not cause unacceptable downstream intensification when a laser beam passes through the mitigated site. In particular, there could be features of the mitigated site that cause constructive interference that produces intensification sufficient to damage downstream optics, or the exit surface of the mitigated optic, should the mitigated site be on its input surface. Under $CO_2$ laser-heating conditions and at peak temperatures above 2200K, thermo-capillary driven flow can produce a final shape to the mitigated site that can adversely refract and diffract UV laser light passing through it upon subsequent exposure. One of the most common diffracting features in the final shape of the mitigated site is a "rim" surrounding the crater produced by the mitigation procedure. These rims frequently are responsible for producing unacceptably high intensification. Furthermore, any surface structure in the mitigated site that would approximate a positive lens could also produce high intensification. It was realized in developing the subject matter of the present disclosure that meeting requirement 3) was an especially significant challenge in developing a successful mitigation protocol.

Previous to 2005, prior art systems and methods addressed only requirements 1) and 2) described above. Indeed, Brusasco et al., "Methods for mitigating surface damage growth in NIF final optics," L. W., Proceedings of SPIE 4679, 23, in 2002, teach that a single application of a 5 mm, 10.6 um wavelength $CO_2$ laser beam in the power range 17-35 W applied for 1 second was 100% effective at mitigating growth of UV laser-induced surface damage in a fused silica sample. Further, based on this, Hackel et al. in 2003 patented a "Method for producing damage resistant optics" (U.S. Pat. No. 6,518,539). The Hackel et al. invention offers a general description of a $CO_2$ mitigation protocol as a mitigation process on a fused-silica optic that is performed with a $CO_2$ laser to locally soften the material within, and in the immediate vicinity of, each damage site, to thus anneal out each damage site. The Hackel et al. patent describes using a $CO_2$ laser having its power density and duration controlled to thermally soften fused-silica in a way that minimizes vaporization of material and thermally induced stress in the material. However, Hackel et al. makes no mention or suggestion of controlling downstream intensification by controlling the final surface shape of the $CO_2$ laser-mitigated site.

It was not until 2006 that researchers began to appreciate the unique difficulty presented by the downstream intensification produced by the final surface shape of the mitigated damage site. For instance, with Bass et al. in 2006, the mitigation approach was to remove the entire damage site with several high temperature exposures. This procedure involved three scans of a 200 μm diameter laser spot in an inwardly moving spiral over the damage site. In order to remove (ablate) enough material to completely mitigate these sites, large areas of the surface were heated to temperatures between about 2500K and 3000K for the 150 ms duration of the scan. This resulted in re-deposition of some of the ablated material from the site and thermo-capillary driven flow of, silica along the surface of the mitigation pit. However, this re-deposited material was prone to further laser damage. As a result, techniques were developed to re-melt this re-deposited material at lower temperatures. This was done by using the $CO_2$ laser operated at lower power to eliminate the re-deposited material's potential for damage. However, the thermo-capillary driven flow caused the formation of a "bump" at the bottom of the mitigation pit that would very often produce problematic downstream intensification. It was then found that a second pass with a lower power $CO_2$ beam would smooth this "bump" and in certain cases, but not all, alleviate the problematic downstream intensification.

Guss et al., "Mitigation of growth of laser initiated surface damage in fused silica using a 4.6 um wavelength laser," Proceedings of SPIE 6403, 64030M-1, 2007, investigated using a frequency-doubled $CO_2$ laser operating at a wavelength of 4.6 um to mitigate damage sites with deep cracks. The motivation for using 4.6 um light was a >25 times longer absorption length in fused-silica at room temperature compared to that at 10.6 um. Guss et al. showed that it was possible to mitigate damage sites and subsurface cracks using 4.6 um wavelength light without significant ablation of the material. The resulting depths of the mitigated sites were much shallower than those produced by the method used by Bass et al. in 2005, and had no "bump" at the pit's bottom. This lack of a "bump" was due to the reflow of the site being dominated by surface tension vs. thermo-capillary flow forces. However, in some fraction of the mitigated sites it was observed that a rim was created that produced unacceptably high downstream intensification.

In 2008, Matthews et al., "Downstream intensification effects associated with $CO_2$ laser mitigation of fused silica," Proceedings of SPIE 6720, 67200A-1, specifically studied the downstream intensification effect associated with four particular $CO_2$ laser mitigation protocols. These protocols were ablative (>2500K) in nature and left mitigation pits with diameters on the order of 500 um. In all four cases, a rim resulted around the pit with heights on the order of about 3 um. In one case a secondary application of the $CO_2$ laser was used, only along the rim, to modulate ("dimple") the rim and thus reduce its symmetry. Matthews et al. found that the downstream intensification pattern due to the pits generally had two main components—an on-axis "hotspot" and an off-axis "ring caustic". Both the "hotspot" and "ring caustic" were quantitatively predicted and experimentally shown to have high enough intensification to initiate downstream damage for relevant fluences (~8 J/cm$^2$) and downstream distances (<150 mm). For the "dimpled" rim case, however, the predicted number of damage sites was essentially zero and no damage was experimentally observed. This implies that the rim was the main culprit driving the intensification and that the resulting intensification could be brought to non-damaging levels by modifying or, in this case, "dimpling" the rim.

SUMMARY

In one aspect the present disclosure relates to a method for repairing a damage site on a surface of an optical material. The method may involve focusing an Infrared (IR) laser beam having a predetermined wavelength, with a predetermined beam power, to a predetermined full width ("F/W") 1/e$^2$ diameter spot on the damage site. The focused IR laser beam may be maintained on the damage site for a predetermined exposure period corresponding to a predetermined acceptable level of downstream intensification. The focused IR laser beam heats the damage site to a predetermined peak temperature, which melts and reflows material at the damage site of the optical material to create a mitigated site.

In another aspect a method of repairing a damage site on a surface of an optical material is disclosed which may involve focusing an Infrared (IR) laser beam of a predetermined, wavelength, with a predetermined beam power, to a predetermined full width ("F/W") 1/e$^2$ diameter spot on the damage site. The focused IR laser beam may be maintained on the damage site for a predetermined exposure period. The focused IR laser beam may be used to heat the damage site to a predetermined peak temperature of between about 1900K to about 2500K. This causes melting and reflowing of the optical material at the damage site to create a mitigated site.

In still another aspect the present disclosure involves a system for repairing a damage site on a surface of an optical material. The system may comprise an Infrared (IR) laser generating a laser beam having a predetermined wavelength, with a predetermined beam power, and such that the laser beam is focused to a predetermined full width ("F/W") 1/e$^2$ diameter spot on the damage site. The IR laser may be configured to maintain the focused IR laser beam on the damage site for a predetermined exposure period corresponding to a predetermined acceptable level of downstream intensification. The focused IR laser beam may be used to heat the damage site to a predetermined peak temperature, which results in melting and reflowing of material at the damage site of the optical material to create a mitigated site.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the following drawing figures.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
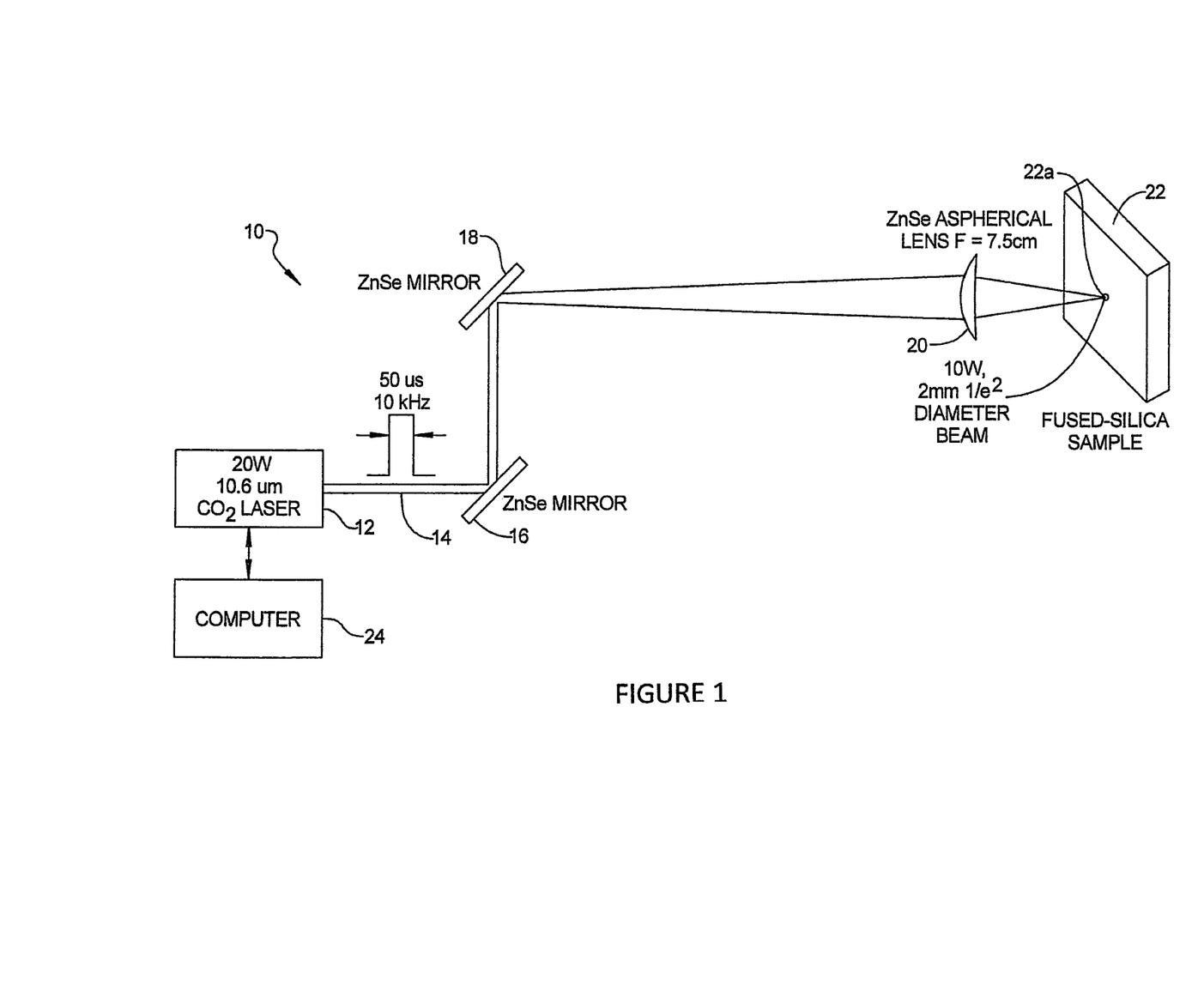
FIG. 1 is a high level block diagram illustrating one implementation of a system for performing damage site mitigation on a material such as a fused-silica optic.

Referring to FIG. 1, one embodiment of a system 10 is shown for carrying out one preferred methodology of the present disclosure. In this example a 20 W, quasi-continuous-wave 10.6 um wavelength $CO_2$ laser 12 is used that outputs a laser beam 14 preferably having a Gaussian spatial profile. The laser beam 14 may be used at preferably about 10 kHz and at an approximate 50% duty cycle. The laser's beam 14 is allowed to free-propagate, using ZnSe mirrors 16 and 18, to a 7.5 cm focal length aspheric ZnSe lens 20. The lens 20 focuses the laser beam 14 to an approximate 2 mm diameter ("FW" $1/e^2$) spot on the surface of a material 22. In this example the material 22 is a fused-silica optic (referred to hereinafter as "fused-silica optic 22") having a damage site 22a of no more than about 110 um in diameter. The laser's 12 power as a function of time may be controlled via a computer 24, for example a personal computer or laptop, programmed to control the laser 12 to cause the laser to generate a beam with a predetermined power profile.

Figure 2:
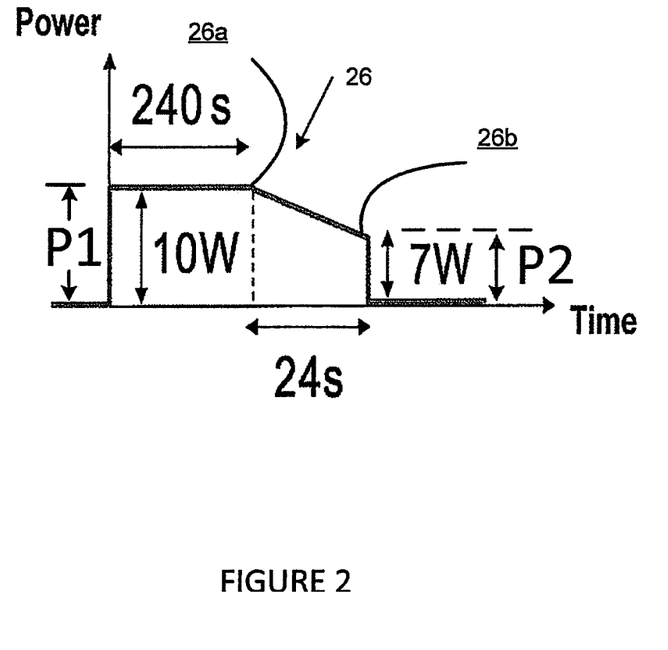
FIG. 2 is a graph of a laser beam power profile generated by the laser of FIG. 1 that makes use of a "truncated", linearly decreasing ramp portion.

Referring to FIG. 2, a graph is shown of one specific predetermined power profile, which is indicated by reference numeral 26, and which will be discussed in greater detail in the following paragraphs. The graph of FIG. 2 represents the average $CO_2$ laser 12 power versus exposure time of the beam 14 to the fused-silica optic 22.

The approach to developing the subject matter of the present disclosure has focused in part on identifying a set of process parameters that, when applied to damage sites in the surface of the fused-silica optic 22, would not cause the evaporation of any material, and still simultaneously meet all three of the acceptability requirements discussed above (i.e., prevent the re-initiation and/or growth of a damage site upon subsequent exposure of the fused-silica optic 22 to ultraviolet (UV) laser pulses; control residual stress so that nearby flaws or cracks in the surface of the fused-silica optic 22 will not subsequently induce fracture; and produce a mitigated site in the fused-silica optic 22 having a final physical surface shape which does not produce unacceptable downstream intensification when a laser beam passes through the mitigated site).

For a given beam 14 diameter and power, it was observed that the effectiveness of a protocol against re-initiation/growth increased with exposure time. Additionally it was observed that as the exposure time of the $CO_2$ laser beam 14 to the fused-silica optic 22 increased, the downstream intensification also increased. So for the present disclosure, a significant challenge was presented in discovering an optimum balance between power (for a fixed beam diameter, i.e. peak temperature) and exposure time where a damage site is reflowed to the point of being adequately mitigated (100% effective), but not modified to the point where downstream intensification becomes a potential problem.

Further, in the development of the subject matter of the system and methodology of the present disclosure, it was determined that rim formation around the mitigated damage site was not the specific feature of the final shape of the mitigated damage site on the fused-silica optic 22 that was principally responsible for causing unacceptably high downstream intensification. Instead, it was discovered that the resulting shape of the walls near the top of a crater formed at the mitigated damage site are most responsible for producing downstream intensification. It was also observed that with prior art systems and methods for site mitigation, the reflowed walls diffract and focus the light into a "hot" caustic or ring. The caustic or ring can easily have downstream intensifications of about 3:1.

The present disclosure therefore recognizes the need for highly specific, controlled ranges for a plurality of process specific parameters to achieve successful damage site mitigation in the fused-silica optic 22. Most specifically, the present disclosure identifies and recognizes the need to closely control at least four important parameters: 1) beam diameter ("FW" $1/e^2$); 2) beam power; 3) exposure time; and 4) peak temperature of the damage site. It has been discovered that it is strongly preferable that the $CO_2$ laser beam 14 has a full width (i.e., "FW" $1/e^2$ diameter) sufficiently large to bring the entire damage site to within a closely specified temperature range for a closely specified exposure time. In particular, it has been discovered that the entire damage site should be treated with a beam that produces an irradiance (W/cm$^2$) that results in preferred temperatures between about 1900K and about 2200K at the damage site of the fused-silica optic 22. This preferred temperature range should be maintained long enough to mitigate the laser damage, but not so long that the morphology of the damage site changes to the point where the downstream intensification becomes problematic.

In view of the above, one highly important aspect of the present disclosure has been developing a methodology to find a satisfactory dwell time for a given laser irradiance. With this methodology, a plurality of operations may involve: 1) creating a set of damage sites with a laser; 2) exposing the damage sites to single applications of the $CO_2$ laser beam at an irradiance to reach the specified temperature range for different dwell times; 3) measuring the downstream intensification from the treated sites with a suitable device as a function of dwell time; 4) selecting the dwell time and irradiance to ensure acceptable downstream intensification; 5) laser damage testing the damage sites which passed the intensification test to a desired fluence to ensure the damage threshold is acceptable; and 6) setting the exposure conditions to satisfy the damage threshold and intensification metrics as described above.

In view of the above, the diameter ("FW" $1/e^2$) of the laser beam 14 preferably should be maintained in the range of about 1.9 mm to about 2.1 mm. For this beam diameter, the laser beam 14 power should be maintained in the range of about 9.75 W to about 10.25 W to achieve the desired irradiance levels and temperature. The time that the damage site is exposed to the $CO_2$ laser beam 14 preferably is kept within the range of about 210 seconds to about 270 seconds. The power profile 26 in FIG. 2 illustrates this duration as being about 264 seconds. If this and other ones of the parameters described above are not controlled to within the specified ranges, the result could potentially be a failure to meet one or more of the acceptability requirements.

Figure 3:
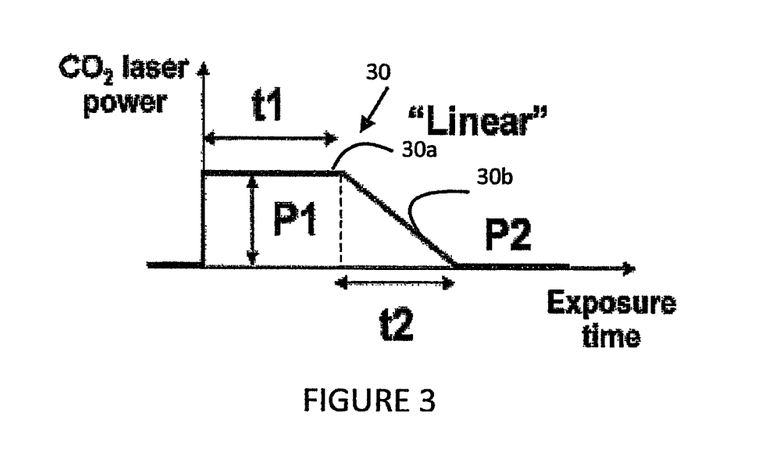
FIG. 3 is a graph showing an alternative laser power profile that includes a linearly decreasing-to-zero portion.
Figure 4:
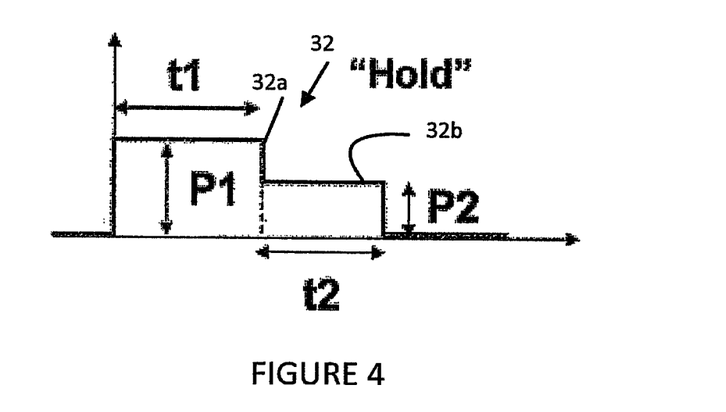
FIG. 4 is a graph of another alternative laser power profile that incorporates a reduced power "step" portion.

It has also been discovered that ramping down the $CO_2$ laser 12 power to just below the glass transition temperature (~1400K) of the fused-silica optic 22 is highly effective in reducing the residual stress left in the fused-silica optic 22 in and around the damage site to an acceptable level. Furthermore, it has been found that introducing various "ramps" in the $CO_2$ laser 12 power are all effective in reducing the residual stress in the material being mitigated. For example, the laser beam power profile 26 shown in FIG. 2 makes use of a first continuous power level 26a (P1, 10 W) that is maintained for a first time duration (t1), after which a linearly decreasing power level 26b (P2) forming a "truncated" ramp is used during a second time duration (t2) followed by an immediate turn off. FIG. 3 shows an alternative laser beam power profile 30 that makes use of a first continuous power level 30a (P1) for a first duration (t1), and then a second, linearly decreasing to zero power level 30b (P2, a ramp decreasing to zero) over time duration t2. FIG. 4 shows yet another alternative laser beam power profile 32.

Power profile 32 may have a first continuous portion 32a having a first power (P1) for a first time duration t1, followed by a "step" down to a reduced, continuous power level 32b (P2) for a second time duration t2, followed by an immediate turnoff. It has been found that each of the power profiles 26, 30 and 32 are effective in reducing the residual stress in the fused silica-optic 22. It has also been discovered that for the peak temperatures achieved in the fused-silica optic 22, a ramp down (for a 2 mm beam diameter) from about 10 W, producing a temperature about 2000K, to about 7 W, producing a temperature of about 1400K, over a time of about 24 seconds (as noted in FIG. 2) suitably minimized the residual stress to a point where the probability to see fracture in flaws or cracks with 300 um or less sized features was acceptably low.

Figure 5:
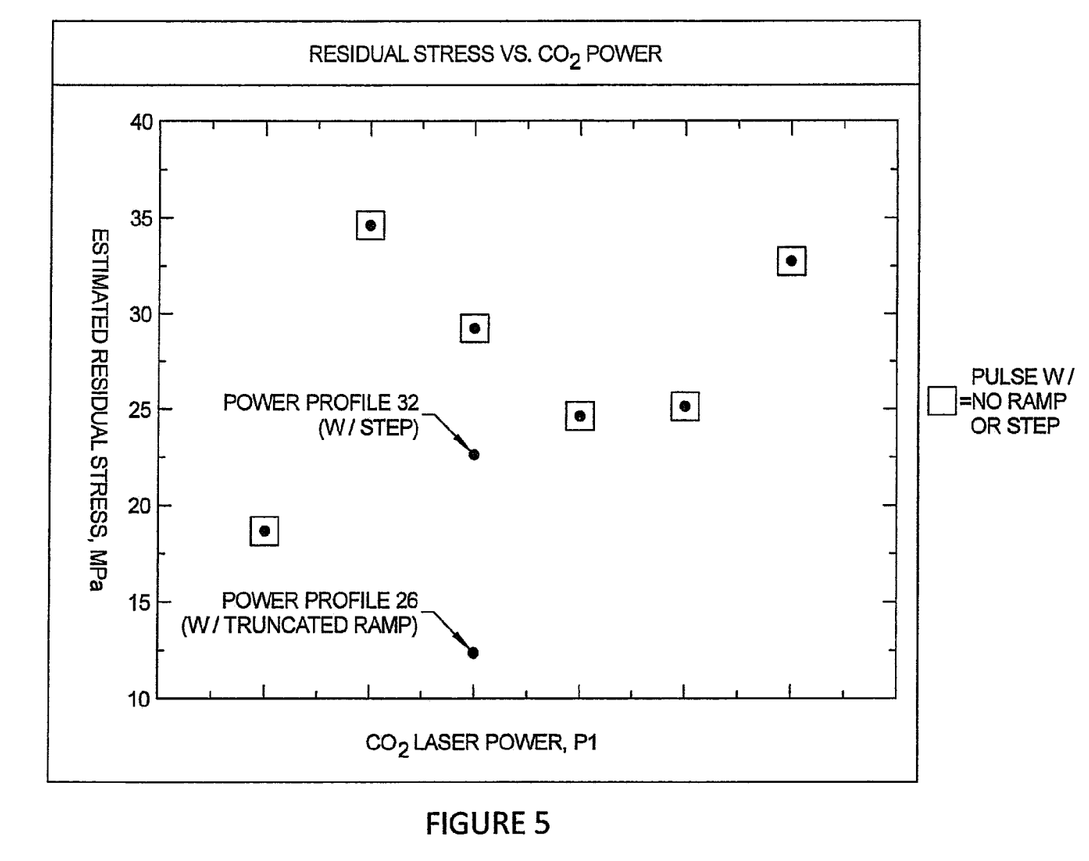
FIG. 5 is a graph illustrating a plot of estimated residual stress (MPa) versus CO2 laser power applied for the second time duration (t2) portions of different laser power profiles.

FIG. 5 illustrates the test results of estimated residual stress (MPa) versus laser power applied for the power profile 26, which has a truncated ramp, and power profile 32, which has P2 as a "step". The solid circles encased within squares indicate estimated residual stress for a simple single power level exposure with no ramp or no step included.

It will therefore be apparent to one skilled in the art that the methods of the present disclosure can be applied to any optical material which absorbs optical energy strongly at a predetermined wavelength, in one example a 10.6 um wavelength. It should also be appreciated that the system 10 and methodology of the present disclosure does not necessarily require a $CO_2$ laser operating at 10.6 um. These results can be achieved using other IR lasers operating at different wavelengths which are also absorbed strongly and which thermally modify the material being treated.

The present disclosure demonstrates that a large number of damage sites with pre-mitigation diameters of up to about 110 um, and possibly even higher, on a fused-silica optic can be successfully mitigated (i.e. meet all three requirements discussed above for successful mitigation). Furthermore, the system 10 and methodology of the present disclosure does not cause re-deposited debris in or around the mitigated site as characterized by high resolution optical microscopy and damage testing.

Figure 6:
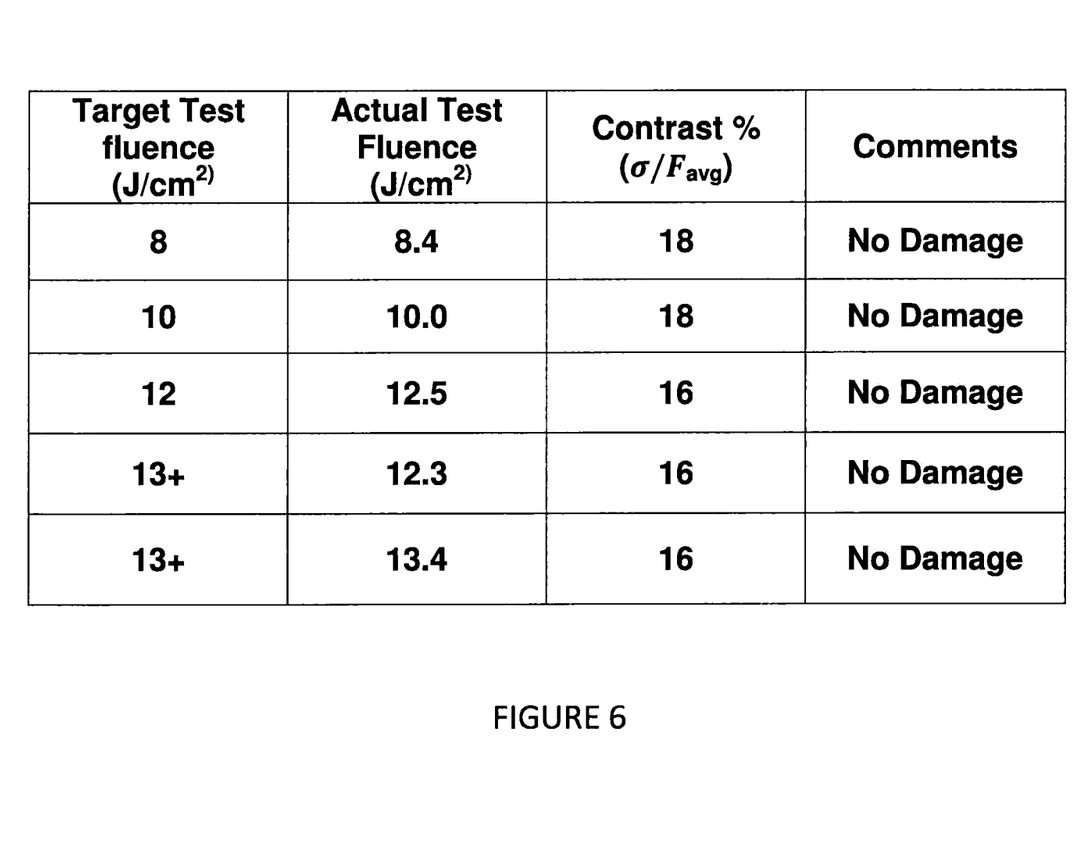
FIG. 6 is chart illustrating the results of damage tests of mitigated sites in the surface of fused-silica optics, conducted using a large-aperture (about 3 cm) laser beam, where the damage sites have been mitigated in accordance with a methodology of the present disclosure.

FIG. 6 lists the results of damage tests conducted using a damage test laser with a large-aperture (about 3 cm) beam at a wavelength of 351 nm. The damage test laser further produced a flat-in-time temporal pulse shape having a 5 ns period. This damage test laser was used to determine the damage threshold for mitigated sites prepared in accordance with the methodology of the present disclosure. The damage tests involved using a fused-silica sample with mitigated damage sites on one surface. The sample was mounted in a chamber held at vacuum ($10^{-5}$ Torr), and subjected to single 351 nm pulses at a rate of about one per hour. The sample was further orientated with the mitigated sites on the output surface with the pattern of mitigated damage sites centered in the damage test laser's beam. FIG. 6 shows that the damage threshold was greater than 12 $J/cm^2$ for a 5 ns flat-in-time pulse at 351 nm wavelength. In addition, the shapes of the mitigated damage sites resulted in measured downstream intensifications that were acceptable, that is, below that at which downstream optics >10 mm away would be damaged (i.e. intensification less than about 2:1). Finally, it will be noted that the residual stress left in the fused-silica optic 22 in and around the final mitigated site would not cause additional fracture or crack growth for nearby surface flaws or cracks with features as large as 300 um.

It will be appreciated then that the system 10 and methodology of the present disclosure provides a means to repair damage sites in the surface of a material, which in one example has been given as a fused-silica optic. It will be appreciated that the system 10 and methodology of the present disclosure may be applied to other materials, and especially materials suitable for forming optics (any glass system, glass systems doped with absorbing ions (i.e. filter glasses), and coated optical materials). Importantly, with the system 10 and methodology of the present disclosure a number of important parameters are met, namely: 1) preventing the re-initiation and/or growth of a damage site upon subsequent exposure to UV laser pulses; 2) leaving behind a low enough level of residual stress so that nearby features (i.e. flaws and/or cracks) in the surface of the material will not subsequently induce fracture; and 3) producing a mitigated site which has a final physical surface shape that will not cause unacceptable downstream intensification when a laser beam passes through the mitigated site.

While various embodiments have been described, those skilled in the art will recognize modifications or variations which might be made without departing from the present disclosure. The examples illustrate various embodiments and are not intended to limit the present disclosure. Therefore, the description and claims should be interpreted liberally with only such limitation as is necessary in view of the pertinent prior art.

What is claimed is:

1. A method of repairing a damage site on a surface of an optical material comprising:

focusing an Infrared (IR) laser beam from a laser, of a predetermined wavelength, with a predetermined beam power, to a predetermined full width ("F/W") $1/e^2$ diameter spot size on the damage site;

maintaining the focused IR laser beam on the damage site for a first time duration at the $1/e^2$ diameter spot size to produce a first, predetermined, continuous level of beam power, which produces a predetermined acceptable level of downstream intensification;

further using the focused IR laser beam at the $1/e^2$ diameter spot size to heat the damage site to a predetermined peak temperature, which melts and reflows material at the damage site of the optical material to create a mitigated site; and while maintaining the $1/e^2$ diameter spot size constant with that used during the first time duration and during the melting and reflowinq of the material at the damage site, subsequently ramping down the beam power to a reduced, second beam power level over a second time duration, the second beam power being at least just below the glass transition temperature of the optical material.

2. The method of claim 1, wherein the material at the damage site of the optical material is melted and reflowed without causing evaporation of the material.

3. The method of claim 1, further comprising controlling the beam power of the IR laser beam to:

subsequently ramp down the beam power linearly to zero over the second time duration.

4. The method of claim 1, further comprising controlling the beam power of the IR laser beam to:

subsequently reduce the beam power to the second, predetermined continuous level, in step fashion, during the second time duration.

5. The method of claim 1, wherein the beam power is reduced from the predetermined beam power during the second time duration, to reduce stress in the optical material.

6. The method of claim 1, wherein the predetermined exposure period comprises a length of time between about 210 seconds to about 270 seconds.

7. The method of claim 1, wherein the laser beam power comprises a power within a range of about 9.75 watts to about 10.25 watts to achieve a desired irradiance level and the predetermined peak temperature.

8. The method of claim 1, wherein the IR laser beam is modulated at a frequency of about 10 kHz with an approximate 50% duty cycle.

9. The method of claim 1, wherein the optical material comprises fused silica.

10. The method of claim 1, wherein the predetermined peak temperature comprises a temperature between about 1900 K to about 2500 K.

11. The method of claim 1, wherein the temperature of the material at the damage site is reduced to just below about 1400 K, to reduce stress in the optical material.

12. The method of claim 1, wherein the operation of focusing an IR laser beam comprises focusing a quasi-continuous-wave $CO_2$ laser beam operating at as wavelength of about 10.6 um.

13. A method of repairing a damage site on a surface of an optical material comprising:
    focusing an Infrared (IR) laser beam from a laser, of a predetermined wavelength, with a first, predetermined beam power level, to a predetermined full width ("F/W") $1/e^2$ diameter spot size on the damage site;
    maintaining the focused IR laser beam at the first predetermined beam power level, and at the $1/e^2$ diameter spot size, on the damage site for a predetermined exposure period forming a first time duration; which heats the damage site to a predetermined peak temperature of between about 1900 K to about 2500 K, which thus melts and reflows material at the damage site of the optical material to create a mitigated site; and
    while maintaining the $1/e^2$ diameter spot size constant with that used during the first time duration and during the melting and reflowing of the material at the damage site, subsequently ramping down the beam power to a reduced, second beam power level over a second time duration, the second beam power being at least just below a glass transition temperature of the optical material to thus reduce stress in the optical material.

14. The method of claim 13, wherein the operation of maintaining the focused IR laser beam on the damage site for a predetermined exposure period comprises maintaining the focused IR laser beam on the damage site for a time period corresponding to a predetermined acceptable level of downstream intensification that is caused by the mitigated site when a subsequent laser beam is directed through the mitigated site.

15. The method of claim 13, wherein the operation of maintaining the focused IR laser beam on the damage site comprises maintaining the focused IR beam on the damage site for a time duration within a range of about 210 seconds to about 270 seconds.

16. The method of claim 13, wherein the beam power of the IR beam is controlled by:
    reducing the beam power, in a ramp fashion, from the first predetermined, beam power level applied during a first time duration, to zero over the length of the second time duration; or
    reducing the beam power in a truncated ramp fashion from the first, predetermined level during to the reduced, second beam power level of beam power during a second time duration, where the reduced, second beam power level is at least less than the glass transition temperature of the optical material but is greater than zero.

17. The method of claim 13, wherein the operation of focusing the IR laser beam comprises focusing a quasi-continuous-wave $CO_2$ laser beam operating at a wavelength of about 10.6 um, and producing a beam diameter of no more than about 2.1 mm, and wherein the IR laser beam is modulated at a frequency of about 10 kHz with an approximate 50% duty cycle.

* * * * *